United States Patent [19]

Roth et al.

[11] Patent Number: 4,958,245

[45] Date of Patent: Sep. 18, 1990

[54] APPARATUS AND METHOD FOR OPTICAL SERVO CONTROL WITH MEDIA HAVING INFORMATION STORAGE AND SERVO CONTROL REGIONS OF DIFFERENT REFLECTIVITIES

[75] Inventors: Maxim Roth, Cupertino; Jimmy D. Godwin, San Jose; Roger O. Williams, Fremont, all of Calif.

[73] Assignee: Insite Peripherals, Inc., San Jose, Calif.

[21] Appl. No.: 178,542

[22] Filed: Apr. 7, 1988

[51] Int. Cl.$^5$ .............................................. G11B 5/596

[52] U.S. Cl. ................................. 360/77.03; 369/120; 369/44.11

[58] Field of Search .......................... 360/77.03, 78.14; 369/14, 46, 120, 275

[56] References Cited

U.S. PATENT DOCUMENTS

| | | | |
|---|---|---|---|
| 4,006,293 | 2/1977 | Bouwhuis et al. | 369/120 X |
| 4,011,400 | 3/1977 | Simons et al. | 369/120 X |
| 4,057,833 | 11/1977 | Braat | 369/120 X |
| 4,149,199 | 4/1979 | Chick et al. | 360/77.04 |
| 4,152,586 | 5/1979 | Elliott et al. | 369/120 X |
| 4,366,377 | 12/1982 | Notthoff et al. | 369/120 X |
| 4,631,395 | 12/1986 | Ando | 369/120 X |
| 4,633,451 | 12/1986 | Ahn et al. | 360/77.03 X |
| 4,633,454 | 12/1986 | Tsukai | 369/120 X |
| 4,654,838 | 3/1987 | Sugiki | 369/120 X |
| 4,689,479 | 8/1987 | Tatsuno et al. | 369/120 X |
| 4,697,256 | 9/1987 | Shinkai | 369/46 X |
| 4,724,369 | 2/1988 | Hashimoto | 360/78.14 X |
| 4,737,877 | 4/1988 | Krongelb et al. | 360/77.03 X |
| 4,807,214 | 2/1989 | Getreuer | 369/275 X |
| 4,816,939 | 3/1989 | Ford et al. | 360/77.03 |
| 4,843,603 | 6/1989 | Prikryl | 360/46 X |

FOREIGN PATENT DOCUMENTS 54-073610 6/1979 Japan .
85/02933 7/1985 PCT Int'l Appl. .

OTHER PUBLICATIONS

D. A. Thompson et al., Embossed Servo Techniques for Floppy Disks, IERE Conference Proceedings, No. 43, p. 321 (Jul. 1979).

N. Koshino & S. Ogawa, Optical Method of the Head Positioning in Magnetic Disk Systems, Reprint From IEEE Transactions on Magnetics, pp. 631–633, 1980.

K. D. Bradbent, A Review of the MCADisco-Vision System, Journal of the SMPTE, 1974.

A. S. Hoagland, Optical Servo of Magnetic Recording, IBM Technical Disclosure Bulletin, vol. 20, No. 10, pp. 4108–4109, Mar. 1978.

A. Paton, Correction of Data Track Misregistration in Servo Controlled Disk Files, IBM Technical Disclosure Bulletin, vol. 17, No. 6, Nov. 1974, pp. 1781–1783.

R. E. Acosta et al., Floppy Disc Embossing for Servo Applications, IBM Technical Disclosure Bulletin, vol. 21, no. 10, Mar. 1979, pp. 4559–4560.

Primary Examiner—Vincent P. Canney
Assistant Examiner—David L. Robertson
Attorney, Agent, or Firm—Thomas E. Schatzel

[57] ABSTRACT

An optical servo head and method for reading position information on a medium, such as a magnetic disk, having a plurality of optical servo tracks in the form of relatively nonreflective regions on a reflective surface of the medium. With a magnetic disk, the nonreflective regions comprise concentric grooves etched in the disk surface and the reflective regions comprise the land areas between the grooves. The optical servo head is mounted on a carriage/head assembly of a disk drive and comprises an infrared light emitting diode, a collection lens, a routing mirror and a multicell photodetector. The method of reading position information from the magnetic disk comprises the steps of illuminating the disk with the infrared diode, focusing the image of the optical tracks on the cells of the photodetector such that a linear signal will be generated as the optical tracks pass the photodetector cells, and generating a continuous output signal from the photodetector cell output which is used to control the positioning of the carriage/head assembly. The output signal can be directed through a synchronous detection circuit to improve the S/N contrast between the reflective and nonreflective areas. Additionally, the output signal can be routed to an alignment circuit comprising a pair of digital-to-analog converters, a pair of digital signal generators, an adder and an electronic filter and which electronically compensates for imprecision in the servo head-data head separation distance. Track sweeping without leaving the position loop is also accomplished through use of the alignment circuit.

33 Claims, 4 Drawing Sheets

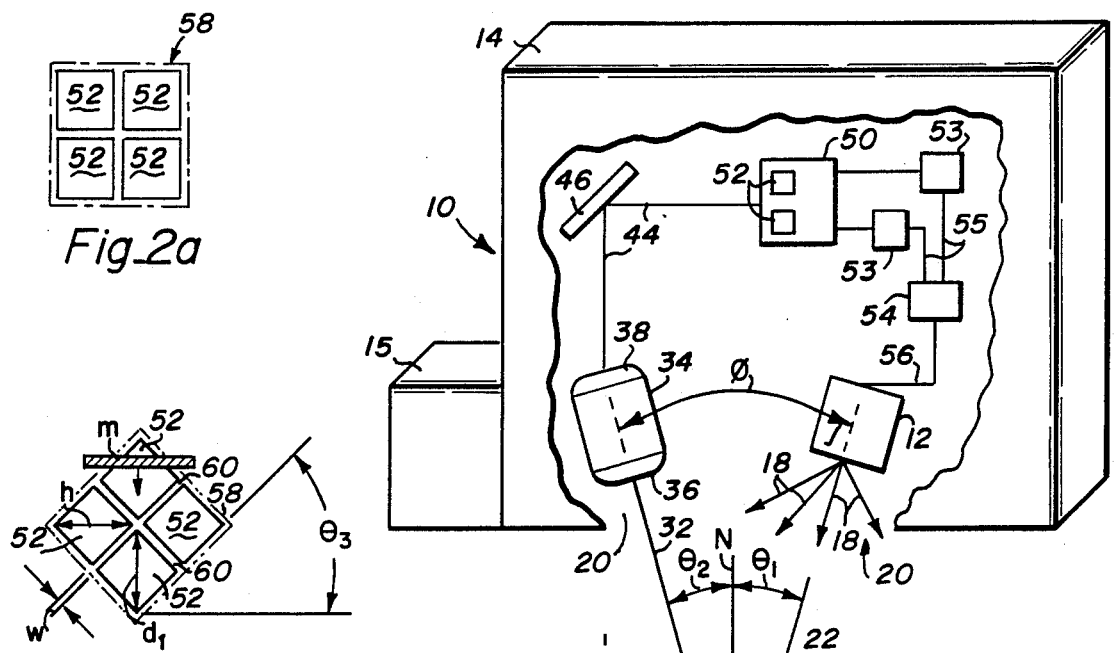
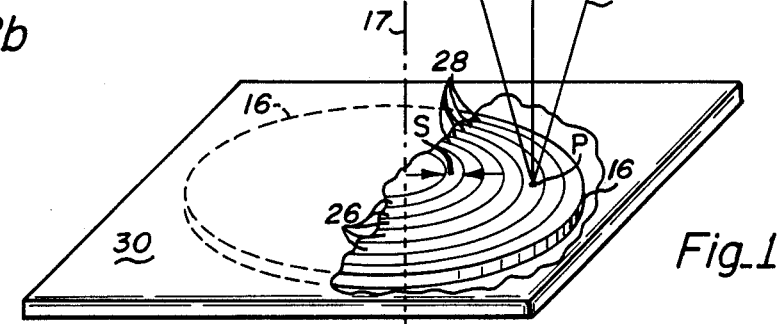
Fig_3a
Fig_3b
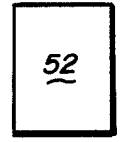
Fig_3c
Fig_3d
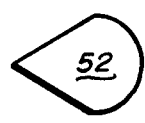
Fig_3e
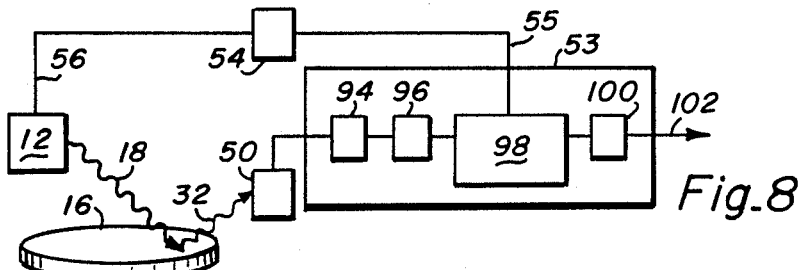
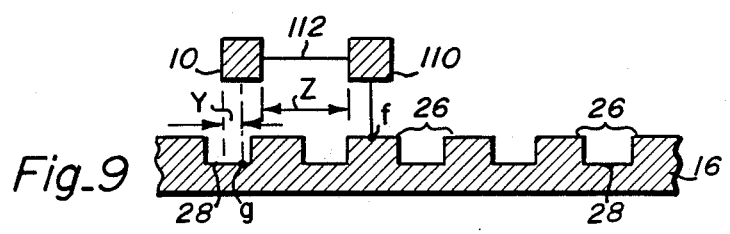

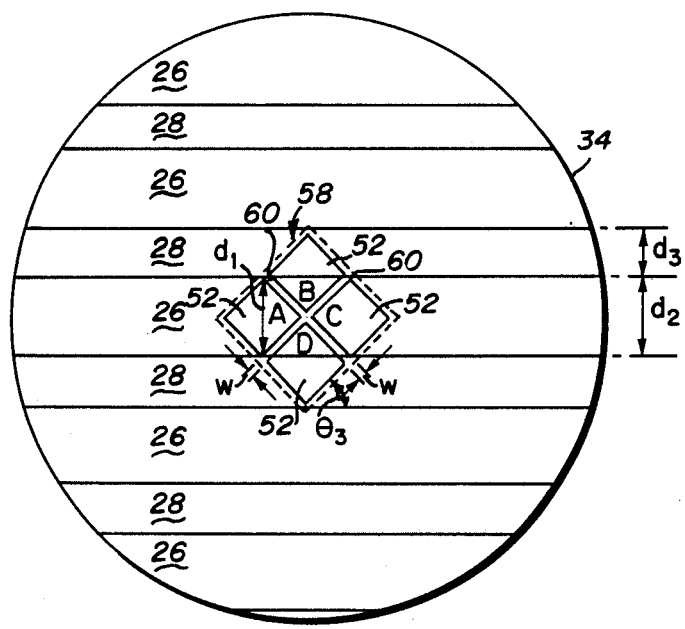
Fig_4a
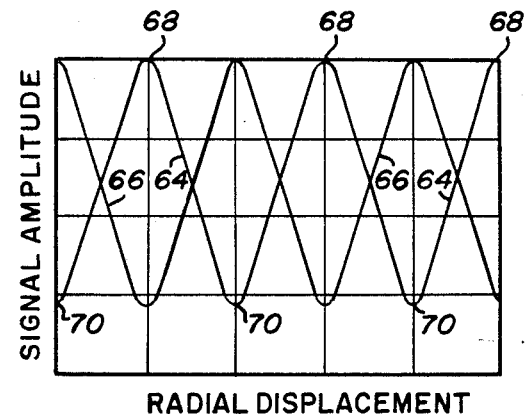
Fig_5
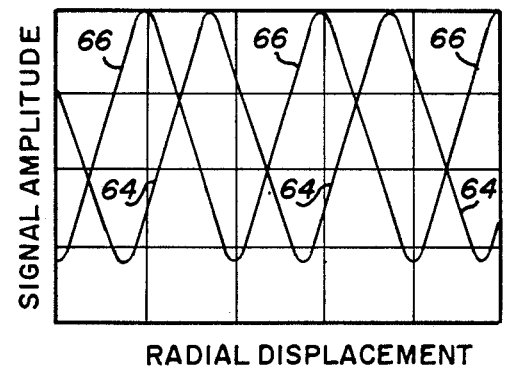
Fig_6
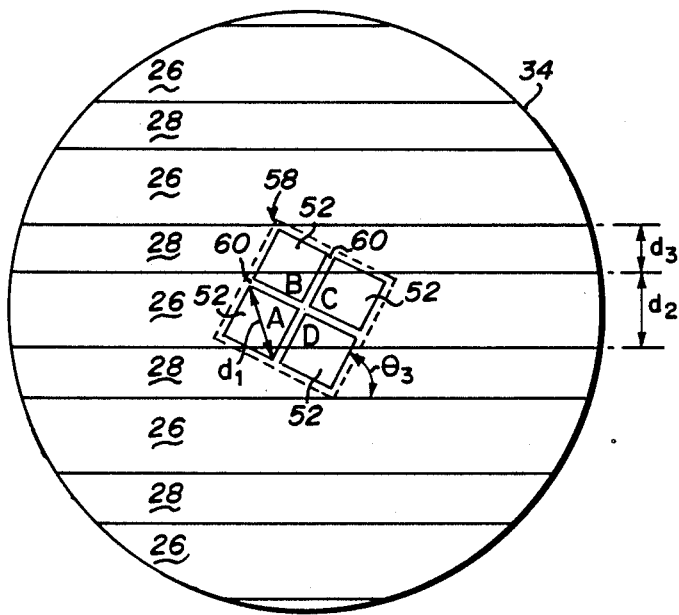
Fig_4b
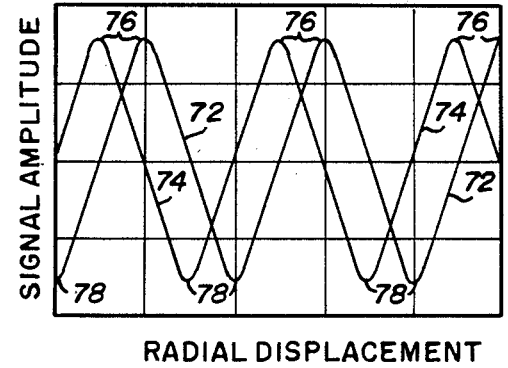
Fig_7

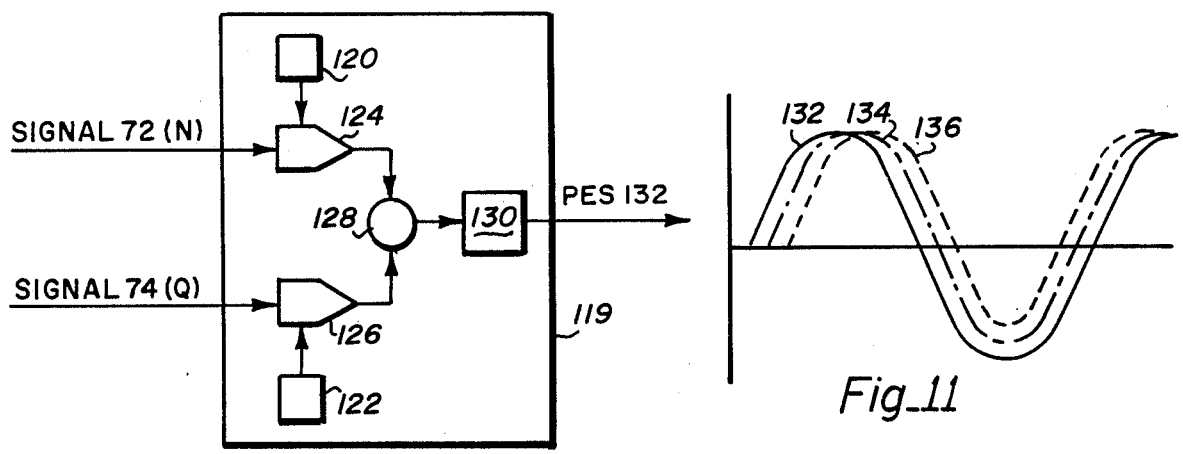
Fig_10
Fig_11
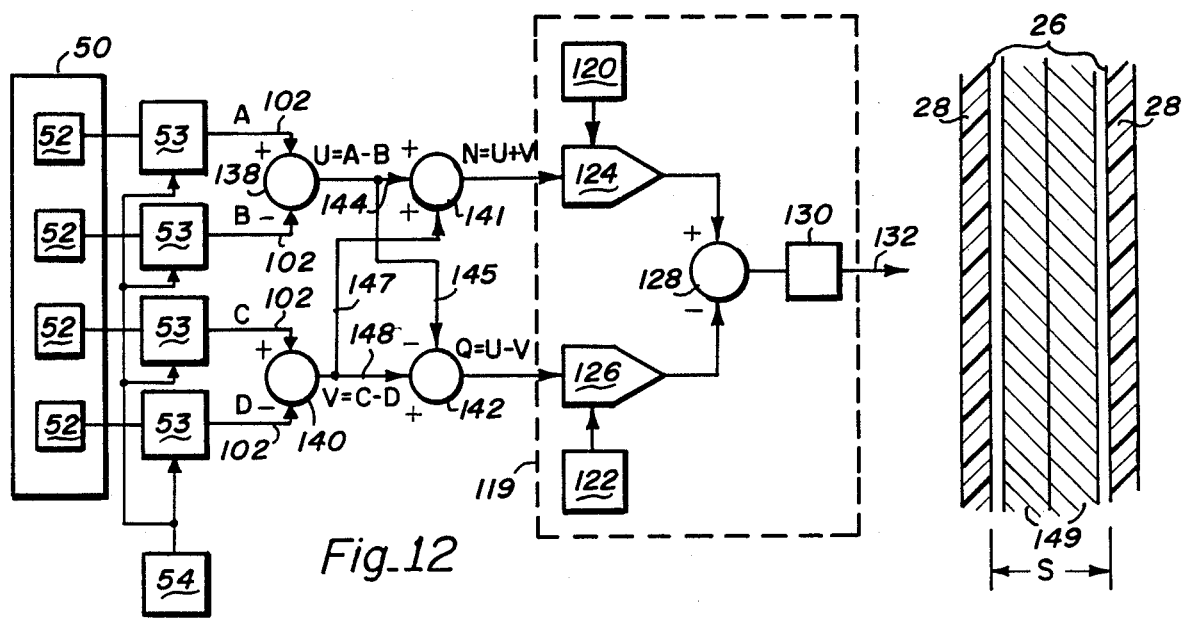
Fig_12
Fig_13
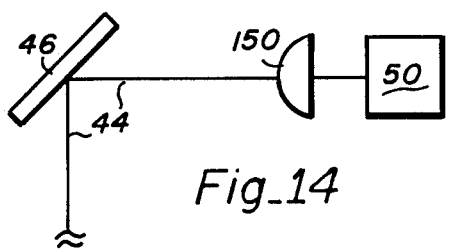
Fig_14

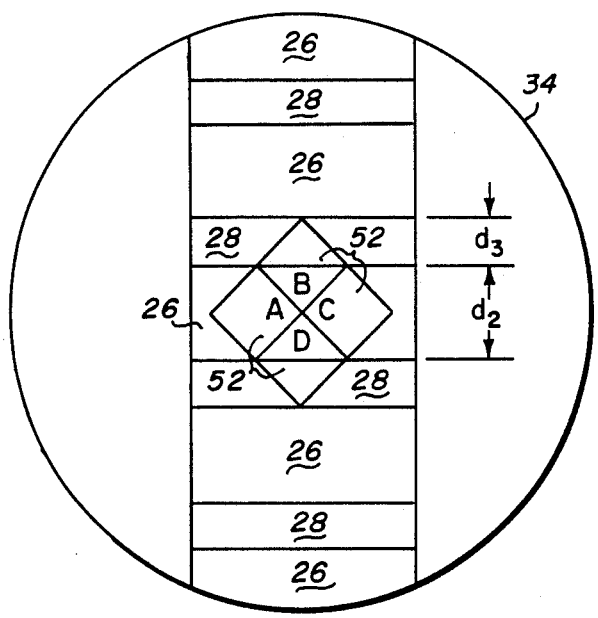
Fig_15
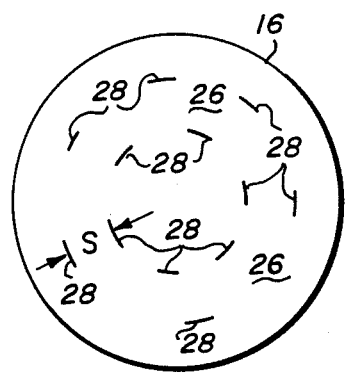
Fig_16a
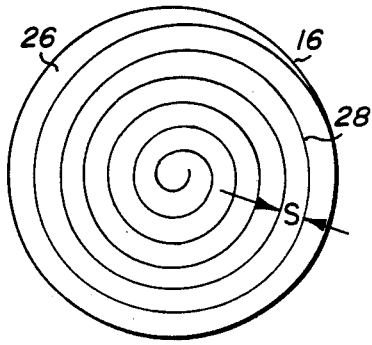
Fig_16b
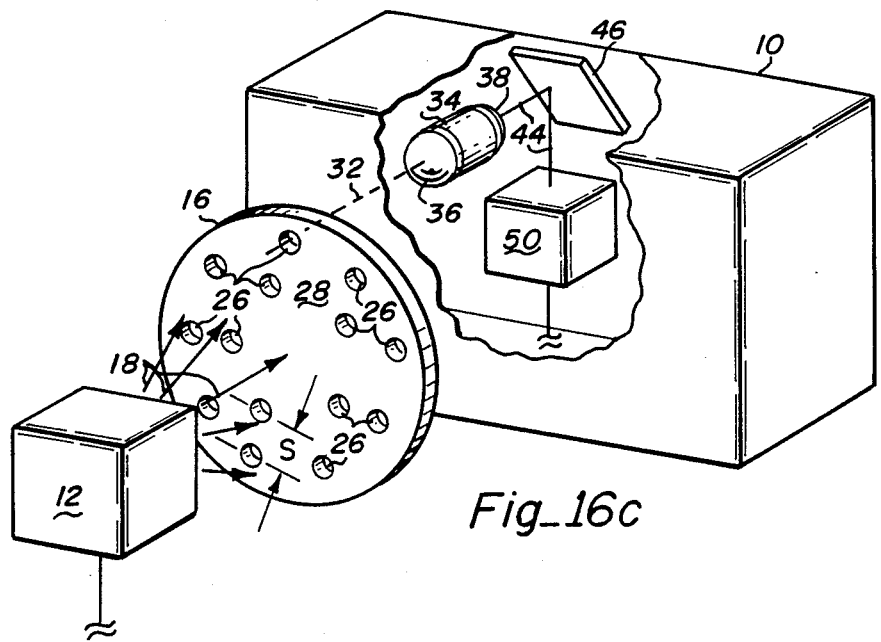
Fig_16c

APPARATUS AND METHOD FOR OPTICAL SERVO CONTROL WITH MEDIA HAVING INFORMATION STORAGE AND SERVO CONTROL REGIONS OF DIFFERENT REFLECTIVITIES

BACKGROUND OF THE INVENTION

1. Field of the Invention

The present invention relates to an optical servo control apparatus and method for use with media having information carrying regions and servo control regions of different reflectivity and more particularly to such an apparatus and method which utilizes an unfocused light source, a photodetector having at least two specially shaped photodetection cells and media having servo control regions comprised of equally spaced grooves or other contrasting areas on the surface of the medium. An electronic circuit processes the output signal from the photodetector so as to permit electronic positioning of a data head over the information carrying region, to permit positioning of the data head when the information carrying region comprises more than one data track per servo track and to permit the data head to change tracks without leaving the position loop.

2. Description of the Prior Art

The track density of magnetic storage disks of conventional magnetic floppy disk drives is approximately forty-eight to one hundred thirty-five tracks per inch. In contrast, optical disk drives are capable of achieving track densities in excess of 15,000 tracks per inch. These higher track densitites are achieved through the use of closed loop optical servos that allow the read/write head to follow data track eccentricities caused by defects in the medium and by disturbances from outside forces.

Various techniques have been reported for using optical means for acquiring servo information contained on a magnetic recording medium. For example, K. Ahn, et al, in U.S. Pat. No. 4,633,451 for "Optical Servo For Magnetic Disks", disclose the use of a laser diode to read servo information in the form of a plurality of spots contained in an optical layer positioned above a magnetic recording layer.

T. DiStefano, et al, in U.S. Pat. No. 4,570,191 for "Optical Sensor for Servo Position Control", disclose a servo sensor comprising a light source and a light detector, axially aligned and contained on a single semiconductor chip.

M. Johnson, in U.S. Pat. No. 4,558,383 for "Information Storage Disk Transducer Position Control System Using a Prerecorded Servo Pattern Requiring no Alignment with the Storage Disk", discloses a servo apparatus having a sensor for detecting a pattern of spots on a surface of an information storage medium. The spots comprise a dense array of substantially translation invariant marks and separate information recording tracks are detected by measuring the rate at which the spots are detected by the sensor.

J. Cocke, et al, in U.S. Pat. No. 4,587,579 for "System for Position Detection on a Rotating Disk", disclose a servo control system comprising a detector for reading a plurality of spiral radial-position encoding patterns on a medium.

A. S. Hoagland in "Optical Servo of Magnetic Recording", IBM Technical Disclosure Bulletin, Vol. 20(10), page 4108 (March 1978), suggests a system for achieving optical servo control where a flexible disk medium includes a plurality of optical servo tracks positioned underneath a magnetic layer.

N. Koshino and S. Ogawa in "Optical Method of the Head Positioning in Magnetic Disk Systems", preprint from *IEEE Transactions on Magnetics* (1980), disclose an optical head for achieving servo control which is mounted on the head arm and which includes an LED light source and three optical fibers for delivering light to a medium. The medium comprises a plurality of circular optical tracks, dyed black, and located underneath a magnetic film.

Related development has occurred in the compact disk (CD) industry where laser detection systems are used to read the very closely spaced laser etched tracks. In a three-beam tracking technique, a six element photodetector cell is utilized. This photodetector has six light sensitive areas, or cells, arranged so that there are four centrally located square or triangular cells flanked by two outer rectangular shaped cells. Typically, the center cells are used for the focus servo function while the two outside cells are used for the tracking servo function. In a far field tracking technique, a photodetector having only four cells is utilized. Both of these techniques depend on the well behaved characteristics of a focused beam of coherent light generated by a laser light source for their proper operation. Additionally, to the inventors' knowledge, all reported optical tracking techniques utilize media having no more than one data track per servo track. Furthermore, all reported serving techniques used in storage devices are unable to move continuously between data and servo tracks while retaining the ability to stop at any point between the data and servo tracks without leaving the position loop.

SUMMARY OF THE PRESENT INVENTION

It is therefore an object of the present invention to provide an optical head that utilizes an incoherent light source.

It is another object of the present invention to provide an optical head that can provide servo information when one or more data tracks are located between two servo tracks.

It is another object of the present invention to provide an optical servo signal from a magnetic data medium where the servo information is decoupled from the magnetic data.

It is another object of the present invention to provide an optical head capable of reading servo information from media having track densities of greater than approximately 1000 tracks per inch.

It is another object of the present invention to provide an optical head that gives a position error signal containing directional (quadrature) information.

It is another object of the present invention to provide an optical head that can generate a continuous position error signal when the information carrying regions and the servo control regions are of equal or nonequal areas.

It is another object of the present invention to provide an electrical circuit that can utilize the position error signal to align the magnetic head over the information carrying region.

It is another object of the present invention to provide an electrical circuit that can utilize the position error signal for track crossing without having to leave the position loop.

Briefly, a preferred embodiment of the present invention includes an infrared light emitting diode (LED), a collection lens, a routing mirror, and a multicell positive intrinsic negative (PIN) photodetector all mounted on a magnetic head/slider assembly. Pulsed light emitted by the LED illuminates a plurality of concentric, alternating, rings of a first degree of reflectiveness and rings of a second degree of reflectiveness on the surface of a magnetic medium. The second degree rings may be grooves etched into the surface of the medium and the first degree reflective rings may be the "land" areas between two rings of the second degree. Light is reflected off the land areas and focused on the photodetector by the collection lens and the routing mirror. The collection lens is designed to create a magnified image of the grooves at the photodetector surface.

The PIN photodetector comprises an array of four individual, square-shaped, photosensitive cells arranged so that a larger square is formed. The large square is oriented so that a diamond configuration is obtained. The light image of the rings projected on the photodetector is focused so that a diagonal of one of the individual cells fits between two groove images.

In this configuration, the PIN photodetector generates a pair of signals, called the N and Q signals, that can be used for servo control. As one of the grooves passes by the collection lens, the response signal from an individual cell of the array begins to decrease and reaches a minimum when the groove image is centered on the individual cell. As the groove image continues across the cell, the signal begins to rise until a maximum value is reached. The signal is linear on both sides of the minimum and maximum values. The signals from two adjacent cells can be electronically subtracted to yield a signal defined as the U signal. The signal from the other pair of adjacent cells can also be electronically subtracted to yield a signal defined as the V signal. The N and Q signals are defined to be the sum and the difference, respectively, of the U and V signals. The servo can be locked on either side of N or Q. Furthermore, the N and Q signals are 90° out of phase, thus producing a quadrature situation. Because the N and Q signals are derived from the configuration of the land and groove areas and not from data recorded on the land or groove areas, the servo signal is decoupled from the magnetic data.

The output from the PIN photodetector can be directed through a synchronous detection circuit before the U and V signals are formed to improve the signal-to-noise ratio. Additionally, the N and Q signals can be used to electronically align the magnetic head over single or multiple data tracks and to change data tracks without leaving the position loop. These head alignment and track changing functions are accomplished by feeding the N and Q signals into a circuit comprised of a pair of digital signal generators, a pair of digital-analog converters, an adder and a low pass filter. The circuit calculates an offset value which will move the optical head off the center of the optical track, but which will move the magnetic head to the center of a data track. By continuously repeating this alignment process, the multiple track reading and the track changing functions are accomplished.

An advantage of the present invention is that the optical head utilizes an infrared light emitting diode as the light source.

Another advantage of the present invention is that a symmetrical continuous position error signal is generated.

Another advantage of the present invention is that the optical servo signal is decoupled from the magnetic data.

Another advantage of the present invention is that a pulsed light source and synchronous detection technique can be employed to enhance the signal-to-noise ratio of the photodetector output signal.

Still another advantage of the present invention is that the photodetector output signal has directional characteristics.

Another advantage of the present invention is that an electronic circuit is described that uses the photodetector output signal to electronically align a head over an information carrying track.

Yet another advantage of the present invention is that the electronic circuit generates a position error signal that can be used to drive a data head across a plurality of tracks without leaving a position loop.

Another advantage of the present invention is that the optical head can provide servo information for media having more than one information carrying track included between two servo tracks.

Still another advantage of the present invention is that a method for reading servo information from a medium containing a plurality of alternating reflective and nonreflective concentric rings is provided.

Another advantage of the present invention is that the optical head is both inexpensive and highly reliable.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 illustrates a diagrammatic perspective view of an optical head illuminating a flexible magnetic disk according to the present invention;

FIG. 2a is a block diagram of a quad-arrangement of photodetector cells;

FIG. 2b shows the quad-arrangement of FIG. 2a rotated by forty-five degrees to yield a diamond configuration;

FIG. 3a shows a photodetector element in the shape of an isosceles triangle;

FIG. 3b shows a photodetector element in the shape of an equilateral triangle;

FIG. 3c shows a photodetector element in the shape of a rectangle;

FIG. 3d shows a photodetector element in the shape of a semicircle;

FIG. 3e shows a photodetector element having a "pie-shape";

FIG. 4a is a schematic view of the disk image as seen on the detector when the detector is rotated at a 45° angle;

FIG. 4b shows the same view as in FIG. 4a, but with the detector rotated at an angle other than 45°;

FIG. 5 is a graphical representation of the signals generated by the cells A and B when the signals are 180° out of phase;

FIG. 6 is a graphic representation of the signals generated by the cells A and B when the signals are approximately 135° out of phase;

FIG. 7 is a graphical representation of the N and Q signals generated by electronically manipulating the signals generated by the cells A, B, C and D;

FIG. 8 shows a block diagram of a synchronous detection circuit for use in improving the signal-to-noise ratio in the signals generated by the cells A, B, C and D;

FIG. 9 shows a cross-sectional view of a magnetic disk with optical and magnetic heads aligned over the land and groove areas on the surface of the disk;

FIG. 10 shows a block diagram of an electronic circuit for electronically manipulating the output signal from the detection circuit shown in FIG. 8 in order to align a data head over a data track;

FIG. 11 is a graphical representation of three position error signals generated by the circuit shown in FIG. 10 with each of the three position error signals having a different phase shift;

FIG. 12 shows a block diagram of the circuit used to generate a position error signal formed by combining the circuits of FIGS. 8 and 10;

FIG. 13 shows a medium having two data tracks positioned between two servo tracks;

FIG. 14 illustrates an alternative embodiment of the optical head of FIG. 1 which includes a cylindrical lens;

FIG. 15 is a schematic view of the disk image as seen on the detector when the alternative embodiment of FIG. 14 is utilized;

FIG. 16a is a top view of a medium having a plurality of noncontinuous servo tracks;

FIG. 16b is a top view of a medium having a single continuous servo track; and

FIG. 16c is a perspective view of a medium utilizing a plurality of transparent spots or holes as the servo tracks.

DETAILED DESCRIPTION OF THE PREFERRED EMBODIMENT

FIG. 1 shows an optical head of the present invention represented by the general reference numeral 10. A light source 12 is mounted on a support assembly 14 which may include a read and/or write head 15 of a magnetic disk drive. A medium 16, which may rotate about an axis of rotation 17, is illuminated by a plurality of unfocused light rays 18 emitted by the source 12 and which pass through an aperture 20 cut in the assembly 14.

In the preferred embodiment, the source 12 comprises an infrared light emitting diode and the rays 18 are pulsed. The illumination of the medium 16 could also be accomplished with a focused beam of coherent or incoherent light or by an unfocused beam of coherent light such as the unfocused beam of a laser.

At least some of the rays 18 are oriented around an optical axis 22 which is centered on the surface of the medium 16 at a point "P". The optical axis 22 forms an angle $\theta_1$ measured from a line N normal to the surface of the medium 16 at the point "P". In general, the angle $\theta_1$ is approximately 20°. A plurality of reflective areas 26 and a plurality of nonreflective areas 28 are located on the surface of the medium 16.

In the preferred embodiment, the medium 16 is a cylindrical piece of a flexible magnetic media enclosed in a rectangular jacket 30, a combination that is typically referred to as a floppy disk. The nonreflective areas 28 comprise a plurality of equally spaced, continuous, concentric grooves inscribed on the surface of medium 16. A spacing "s" exists between the grooves of approximately seventeen microns (0.000680 inches) and the grooves have a width of approximately three microns (0.00012 inches) and a depth of approximately one micron (0.000040 inches). "Nonreflective", as used in the phrase "nonreflective areas 28", refers to relative reflectivity. The nonreflective areas 28 reflect less light than the reflective areas 26. In this embodiment, the nonreflective areas 28 carry the position information and in optical terminology are referred to as groove areas or optical tracks.

The reflective areas 26 are the plurality of spaces (land areas) that exist between the nonreflective areas 28 and are capable of reflecting more light than the nonreflective areas 28. In the preferred embodiment, the reflective areas 26 reflect approximately 4% to 10% of the incident rays 18 and the contrast between the reflective and nonreflective areas is approximately 4% to 10%.

In other embodiments, the groove areas can be more reflective than the land areas. The only requirement is that the contrast between the groove and land areas is sufficient to provide a signal (i.e. approximately 4%–10%).

In FIG. 1, light from the rays 18 is reflected off the reflective areas 26, as a reflected beam 32, at an angle $\theta_2$ relative to line N. The angle $\theta_2$ is equal to the angle $\theta_1$. The beam 32 passes back through the aperture 20 and onto a collection lens 34 located in close physical proximity to the light source 12. An included angle $\phi$ is defined as the angle between the light source 12 and the collection lens 34. In the preferred embodiment, the included angle $\phi$ is equal to $2\theta_1$ and should be in a plane containing the line N in order to maximize the contrast between the reflective areas 26 and the nonreflective areas 28. In alternative embodiments, having different groove shapes and/or different optical configurations, the included angle $\phi$ could lie in a different plane and/or bears no relationship to $\theta_1$ and $\theta_2$.

The collection lens 34 may be a plastic injection molded part with a lens surface 36 which has an aspheric profile and a lens surface 38 which is spherical. The light collection cone of lens 34 has an F number of F/1.75.

A beam 44 emerges from the collection lens 34 and is directed to a routing mirror 46 which directs the beam 44 to a photodetector 50. The photodetector 50 has two or more photodiode cells 52, having identical shapes, for converting light energy to electrical current. The amount of current produced is proportional to the light power impinging on each of the cells 52.

Photodetectors 50 which have been used have a responsivity of approximately 0.6 milliamps/milliwatt. In the preferred embodiment, each of the cells 52 are positive intrinsic negative (PIN) photodiodes.

A plurality of synchronous detection circuits 53, one circuit 53 for each cell 52, are electrically connected to the photodetector 50 for electronically processing the output signal from each cell 52. Each of the circuits 53 are electrically connected to a pulse generator 54 by a lead 55 forming a synchronous detector that provides output position signals for use by a servo control system (not shown). The pulse generator 54 is electrically connected to the source 12 by a lead 56.

In the preferred embodiment, the photodetector 50 has four square cells 52. FIG. 2a shows that the four cells 52 are arranged to form a quad-arrangement 58 which is a square region formed by the cells 52. If the quad-arrangement 58 is rotated at an angle $\theta_3$ of forty-five degrees relative to the horizontal, a "diamond"

configuration, shown in FIG. 2b, is achieved for each of the cells 52. A space 60 of width "w" exists between any adjacent cells 52 in the quad-arrangement 58 and each cell 52 has a vertical dimension "$d_1$" and a horizontal dimension "h". The cells 52 are shaped such that the signal generated by an individual cell 52 varies continuously as a mask of uniform width moves across the surface of the cell 52. The mask could be either a dark strip against a bright background or a bright strip against a dark background. For example, if an individual cell 52 in FIG. 2b is completely illuminated with light, the current generated by the cell 52 is not constant as a mask "m" moves across the face of the cell 52 in the indicated direction. The width of the mask "m" is less than $d_1$ and the length of the mask m is greater than h.

Other shapes, such as isosceles or equilateral triangles, rectangles, half-circles or "pie-shapes" shown in FIGS. 3a, 3b, 3c, 3d and 3e, respectively, would also be suitable for the cells 52. In general, any cell shape for which an incremental change ($\Delta x$) in the radial position of the mask "m" on the cell surface causes an increase or decrease in the output current ($\Delta I$) such that $\Delta I / \Delta x = \pm f(x)$, where $f(x)$ is a nonzero function, would be suitable for use in the detector 50.

A component suitable for use as the photodetector quad-arrangement 58 may be derived from a six-element photodetector found in many commercially available compact disk (CD) players. The two outer photodetector elements are disconnected, thereby leaving the other four elements in the quad-arrangement 58.

FIG. 4a shows a magnified image of the reflective areas 26 and intermediate nonreflective areas 28 as they appear to the quad-arrangement 58 of cells 52 of detector 50 when $\theta_3$ equals 45°. For convenience the four cells 52 have been labeled A, B, C and D. The magnified light rays, from the reflective areas 26 create a width $d_2$ and the magnified image of the nonreflective areas 28 have a width $d_3$. The width $d_2$ is equal to the spacing "s", shown in FIG. 1, times the magnification factor of the lens 34 (discussed later). In the preferred embodiment the width $d_2$ is not equal to $d_3$ and the magnification factor of the collection lens 34 is chosen such that the diagonal "$d_1$" of individual cells 52 fits exactly between the image of two adjacent nonreflective areas 28 (i.e., such that $d_1 = d_2$). In alternative embodiments, $d_2$ and $d_3$ could be equal and/or $d_1$ and $d_2$ might not be equal.

In FIG. 4b, the quad-arrangement 58 has been rotated with respect to the position in FIG. 4a (i.e., $\theta_3$ is not equal to 45°). In this orientation, $d_1$ so that it no longer extends exactly between an angled two adjacent nonreflective areas 28.

FIG. 5 shows a graphic representation of a pair of signals 64 and 66 generated by the cells A and B. The horizontal axis represents radial displacement across the nonreflective areas 28 and the vertical axis represents relative signal amplitude. Thus, the signals 64 and 66 represent the signal output of cells A and B, respectively, versus the relative position of nonreflective areas 28. When the diagonal $d_1$ of cell A is exactly between two nonreflective areas 28, as shown in FIG. 4a, the signal from cell A is at a maximum point 68 in FIG. 5. When one nonreflective area 28 is centered on cell A, the signal from cell A is at a minimum point 70. Thus, as one nonreflective area 28 passes the cell A, the signal 64 drops linearly from the maximum point 68 to the minimum point 70 and then increases linearly back to the maximum point 68. As soon as one nonreflective area 28 clears cell A, another nonreflective area 28 begins to cross. This is important because it prevents any regions with zero slope from occurring in the signals shown in FIG. 5. The ability of the cells 52 to generate continuous output signals allows the optical head 10 to be used when the reflective areas 26 and nonreflective areas 28 have equal widths (i.e. $d_2 = d_3$) or nonequal widths (i.e. $d_2 \neq d_3$). The regions around the maximum points 68 and the minimum points 70 are curved due to the width of the groove, $d_3$, as its image crosses the tips of the diamond shaped cells 52.

The signal from cell B, shown as signal 66, displays the same pattern as the signal from cell A. In FIG. 5, the signals 64 and 66 are shown as being one hundred and eighty degrees out of phase. In other words, when the signal from cell A is at a maximum point 68, the signal from cell B is at a minimum point and vice versa. However, in practice, the phase relationship of the signals 64 and 66 depends largely on the configuration of the quad-arrangement 58, on the space 60 and on the rotation angle $\theta_3$.

In the method for obtaining signals that are 90° out of phase, to be described below, it is desirable that the signals 64 and 66 be out of phase by some degree not equal to 0° or 180°. In the preferred embodiment, by rotating the quad-arrangement 58 of cells 52 to the orientation shown in FIG. 4b, where $\theta_3$ is approximately 57°, a satisfactory phase difference of 135° can be obtained for the signals 64 and 66. The optimal value of $\theta_3$ and of the phase difference will vary for different geometries of the detector 50 or for different widths "w" for the space 60.

FIG. 6 shows the signals 64 and 66 having a suitable phase difference of approximately 135°. The output signals from cells C and D produce a pair of signals analogous to the signals 64 and 66 shown in FIG. 6.

FIG. 7 shows a pair of signals 72 and 74 generated by electrically manipulating the output signals from the cells A, B, C and D. The signal 72 is referred to as the normal or N signal and the signal 74 is referred to as the quadrature or Q signal. Each of the signals 72 and 74 have a plurality of maximum points 76 and a plurality of minimum points 78. The signal 72 is ninety degrees out of phase with the signal 74 meaning that the maximum points 76 and the minimum points 78 on the signal 72 overlap the midpoints between the maximum and minimum points 76 and 78 on the signal 74.

FIG. 8 is a block diagram showing the analog electronic components of the optical head 10 in more detail (optical components are not shown). Each synchronous detection circuit 53 comprises an amplifier 94 electrically connected to the detector 50; a bandpass filter 96 electrically connected to the amplifier 94; a multiplier 98 electrically connected to the bandpass filter 96; and a lowpass filter 100 electrically connected to the multiplier 98. An output lead 102, electrically connected to the lowpass filter 100, provides a means for delivering the signals from the cells A, B, C or D to other electronic circuitry for achieving the servo control function of the head 10. The pulse generator 54 is electrically connected to the multiplier 98 by lead 55.

The circuitry shown in FIG. 8 improves the sensitivity of the optical head 10 by permitting synchronous detection techniques to be utilized. The signal generator 54 pulses the rays 18 at a known frequency $f_1$ (carrier). The rays 18 are modulated when they encounter the surface of the medium 16. Thus, the reflected beam 32, at the frequency $f_1$, is amplitude modulated by the intensity information from the reflective areas 26 and nonreflective areas 28. The amplifier 94 boosts the output from the detector 50. The bandpass filter 96 removes extraneous noise from the amplified signal and the multiplier 98 rectifies the amplitude modulated carrier The lowpass filter 100 removes all frequency components above the desired modulator bandwidth. The output from the lowpass filter 100 is the signal having the form of signal 64 or signal 66 shown in FIG. 6.

In order to generate the signals 72 and 74, shown in FIG. 7 the outputs from the circuits 53 are electronically manipulated by a plurality of transducers (shown later in FIG. 12). This electronic manipulation involves the steps of: first, subtracting the output signal of cell B from the output signal of cell A to yield a signal U; second, subtracting the output signal from cell D from the output signal of cell C to yield a signal V; third, forming a pair of signals N and Q where $N=U+V$ and $Q=U-V$. The signals N and Q are the signals 72 and 74, respectively. The signals N and Q are in quadrature because they are ninety degrees out of phase (i.e $N=Q\pm90°$). A prerequisite to the generation of the signals N and Q is that the signals U and V approximate sine waveforms and that they not be in phase or not be 180° out of phase.

The N and Q signals (signals 72 and 74), possess several characteristics that are useful to a servo electronics system for use with a high track density magnetic disk. First, the signals 72 and 74 are linear as the optical servo tracks (nonreflective areas 28) pass the optical head 10. This characteristic is ensured by fixing the magnification of the collection lens 34 such that the diagonal d1 in FIG. 4a fits exactly between the image of two nonreflective areas 28. The proper magnification factor for lens 34 can be calculated from the geometry of the cells 52 shown in FIG. 4a. Where s equals the width of the reflective area 26 from FIG. 1, the magnification factor (mf) is given by $$mf = d_1/s. \tag{1}$$

In the preferred embodiment, $d_1=0.00376$ inches $s=0.00068$ inches, yielding an mf of 5.53.

Second, since the two signals 72 and 74 are ninety degrees out of phase, they can be used to provide directional information (quadrature) to each other.

FIG. 9 shows a cross-sectional view of the medium 16. The optical head 10 and a data head 110, which could be the magnetic read/write head 15, are physically attached to each other by a physical means 112, which fixes a mechanical separation distance Z between the heads 10 and 110. The head 110 is shown centered over a center point f located approximately in the middle of the reflective area 26. The optical head 10 is shown centered over a point g which is offset from the center of the nonreflective area 28 by an offset distance y.

FIG. 10 shows a circuit 119 for electronically manipulating the signals 72 and 74. A pair of digital signal generators 120 and 122, capable of generating sine and cosine waveforms, or equivalent, are electronically connected to a pair of digital-analog converters 124 and 126, respectively. Each of the converters 124 and 126 are electrically connected to an operational amplifier (adder) 128 which is electrically connected to a lowpass filter 130. The digital signal generators 120 and 122 could be, among other things, microprocessors, read only memories (ROMS), counters or registers. A position error signal (PES) 132 is the output of the circuit 119. The PES 132 has the same waveform as either signal 72 or 74, but is shifted in phase from the N and Q signals by a controllable amount.

The signals 72 and 74 can be used to align the optical head 10 and the data head 110. In order to maximize the ability of the head 110 to read and write data, it is desirable that the head 110 be centered over the reflective area 26 at the point f as shown in FIG. 9. However, in the manufacturing process of the optical head 10, it is desirable not to precisely define the mechanical separation distance Z between the optical head 10 and the data head 110. If the distance Z is manufactured within a certain tolerance (e.g., approximately 0.005 inches), the signals 72 and 74 can be used to insure that the head 110 is always centered on the point f. This is accomplished by allowing the optical head 10 to be offset from the center of the nonreflective area 28 by the offset value y. The offset value y is electronically determined by using the signals 72 and 74 and the angle-sum or angle-difference trigonometric relations. For example, equations (2) and (3) below can be used to determine the value of y. In equation (2), Acos x is the signal 72, Asin x is the signal 74 and Acos k and Asin k are digital words generated by the signal generators 120 and 122, respectively, shown in FIG. 10. The parameter k is an angle of the phase shift of the PES 132 required to offset the optical head 10 by the distance y.

$$A\sin \times A\cos k - A\cos \times A\sin k = A^2\sin(x-k) \tag{2}$$

The terms are multiplied in the multiplying digital-to-analog converters 124 and 126 and subtracted by operational amplifiers. The difference, $A^2\sin(x-k)$, is the PES 132 phase shifted by an amount k degrees The offset value y is related to k by equation (3):

$$y = \frac{k}{360°} \frac{(d_2 + d_3)}{mf} \tag{3}$$

where k is in units of degrees and y is in units of length.

The PES 132, which is the output signal from the circuit 119, is used to maintain the optical head 10 at the position g (shown in FIG. 9) thus forcing the data head 110 to be centered over the reflective area 26. This control function can be accomplished by standard servo techniques. For example, the PES 132, which is a voltage signal roughly proportional to postion of the optical head 10, can be converted to a current. The current is then passed through a coil in a magnetic field which generates a force on the support assembly 14. When the assembly 14 is disturbed from its proper position, an actuator generates a force which pushes the assembly 14 back to the proper position.

Another function of the PES 132 is to permit the optical head 10 to enter a seeking mode. During normal operation, a position function holds the data head on track (i.e., the PES 132 is maintained at a constant voltage). In the seeking mode, the head 10 crosses one or several of the optical tracks (nonreflective areas 28) but retains continuous position information without leaving the position loop. Remaining in the position loop during the seeking mode minimizes head settling time.

FIG. 11 illustrates the way in which the PES 132 is utilized in the seeking mode. By continuously multiplying the N and Q signals with the digital words Acos k and Asin k through circuit 119 (shown in FIG. 10), the phase of the PES 132 is shifted. This generates a new PES 134 which causes the optical head 10 to shift to a different region of the track or to a new track. By continuing this process another signal, PES 136, is generated which causes another whole or partial track shift. Thus, by continuous use of circuit 119, the optical head 10 can be continuously rolled across the optical tracks (nonreflective areas 28).

This seeking process can be summarized as follows:
1. input signals 72 and 74 into circuit 119;
2. input phasing signals with signal generators 120 and 122 and DAC's 124 and 126;
3. multiply sine/cosine with input signal;
4. generate phase shifted PES by subtracting signals with operational amplifier 128 and passing through low pass filter 130.
5. roll optical head 10 through phase to obtain offset of data head 110; and
6. continuously repeat steps 2–4 to achieve seeking mode.

FIG. 12 shows the manner in which the circuits 53 and 119 are combined to produce the PES 132. The pair of output leads 102, which carry the A and B signals, are electrically connected to a first adder 138. The adder 138 is used to electronically form the signal U which is the difference A−B. The pair of output leads 102, which carry the C and D signals, are electrically connected to a second adder 140. The adder 140 is used to electronically form the signal V which is the difference C−D.

The signal U is then transmitted to a third adder 141 and to a fourth adder 142 by a pair of electrical leads 144 and 145, respectively. The signal V is transmitted to the adders 141 and 142 by a pair of electrical leads 147 and 148, respectively. The signal N, which is the sum U+V, is electronically formed by the adder 141 and the signal Q, which is the difference U−V, is electronically formed by the adder 142. The N and Q signals are then electronically manipulated by the circuit 119 as previously described.

FIG. 13 shows another use of the PES 132. Two or more data tracks 149 can be located on the reflective area 26 positioned between two nonreflective areas 28. The reflective area 26 has the total width "s" which is the separation between the nonreflective areas 28. The PES 132 generated by the circuit 119 can be used to move the optical head 10 (and hence the data head 110) in small increments so that the data head 110 can be centered on any of the data tracks 149. The small incremental movements are achieved by utilizing the technique described above for the seeking process, but by changing the digital words "Acos k" and "Asin k" to appropriate values to obtain the small incremental movements.

FIG. 14 shows a portion of an alternative embodiment of the optical head 10 shown in FIG. 1. In the alternative embodiment, a cylindrical lens 150 has been inserted between the routing mirror 46 and the photodetector 50. The cylindrical lens 150 has curvature in only one axis thus creating an anamorphic magnification (i.e. different magnification in one axis from the other) which increases the field view of the detector 50. Except for the inclusion of the cylindrical lens 150, the alternative embodiment of FIG. 14 is identical to the preferred embodiment shown in FIG. 1.

FIG. 15 shows the effect of the cylindrical lens 150 on the image of the reflective areas 26 and nonreflective areas 28 projected on the cells 52. The dimensions perpendicular to the land and groove areas (i.e. $d_2$ and $d_3$) are uneffected. However, the direction parallel to the land and groove area is compressed. This has the effect of making the reflective areas 26 appear brighter than they would in the absence of the lens 150, thus improving the contrast between the reflective areas 26 and the nonreflective areas 28.

The exact embodiment of the medium 16, shown in FIG. 1, is not critical to the functioning of the optical head 10. The medium need only have a plurality of alternating reflective areas 26 and equally spaced nonreflective areas 28 (i.e. the spacing "s" should be constant throughout the medium 16). For example, FIG. 16a shows the medium 16 where the nonreflective areas 28 comprise a plurality of noncontinuous darkened areas arranged in concentric rings. The darkened areas could be grooves etched in the surface of the medium 16 or they could be produced by some other method such as a photolithographic process. The surface area of medium 16 not containing the darkened areas would serve as the reflective areas 26. The medium 16 could be a hard disk, comprised of a metal, or a floppy disk as previously described or a magnetic tape or any other medium capable of supporting the plurality of alternating reflective areas 26 and nonreflective areas 28.

FIG. 16b shows an embodiment of the medium 16 in which the nonreflective area 28 comprises one continuous track in the form of a spiral.

FIG. 16c shows another embodiment of the medium 16 wherein the reflective areas 26 comprise a plurality of spots arranged in concentric circles on the medium 16. The spots could be holes extending perpendicularly through the medium 16 or they could be transparent or semitransparent regions on the medium 16. The nonreflective areas 28 comprise the surface regions of the medium 16 surrounding the spots. In this embodiment, the reflective areas 26 actually pass light and the nonreflective areas 28 block light or pass less light. As shown in FIG. 16c, this embodiment would require that the light source 12 be positioned on the opposite side of the medium from the optical head 10.

In the preferred embodiment of FIG. 1, the image of the reflective areas 26 and the nonreflective areas 28 is generated by illuminating the medium 16 with the light rays 18 generated by using an infrared light emitting diode (IR LED) as the source 12. The use of an IR LED provides several advantages in terms of performance and cost. First, the output power of an IR LED is higher than that of a visible LED and can be further increased by operating the LED in a pulsed mode. Secondly, the IR LED signal can be still further enhanced by using a photodetector having its highest sensitivity in the infrared region. Thirdly, the IR LED is a low cost component which is more reliable than a laser light source for long term operation.

In the preferred embodiment, the medium 16 acts as a mirror and reflects four to ten percent of the rays 18 from the reflective areas 26. The reflected beam 32 carries with it an image of medium 16 showing the reflective and nonreflective areas 26 and 28. Light incident on a nonreflective area 28 tends to scatter instead of being reflected in a specular manner, thus causing the nonreflective areas 28 to appear darker than the reflective areas 26 as less light is collected by the lens 34 and transmitted to the detector 50 in these regions. When the dimensions of the nonreflective areas 28 are of the same order of magnitude as the wavelength of incident light (0.9 microns for infrared light), there is some diffraction of the rays 18 along with the scattering. The final contrast ratio of nonreflective area 28 to reflective area 26 depends on the sensitivity of optical head 10 to diffraction, collection F/#, magnification, and the physical configuration of the photodetector 50.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An apparatus for extracting servo control information from a magnetic information storage medium containing a plurality of reflective areas and a plurality of nonreflective areas which comprises:
   a light source for illuminating a plurality of reflective areas having a first width, and a plurality of nonreflective areas having a second width, on a surface of a magnetic medium;
   a collection lens for focusing an image of at least one of said reflective areas and at least one of said nonreflective areas; and
   a photodetector comprising a first cell, a second cell, a third cell and a fourth cell, said first through fourth cells functioning to generate a first output signal, a second output signal, a third output signal and a fourth output signal, respectively, in response to illumination of said first through fourth cells by said image, and each of said first through fourth cells having approximately identical shapes, said shapes causing said first through fourth output signals to vary continuously as said image moves relative to said first through fourth cells.

2. The apparatus of claim 1, further including:
   a cylindrical lens positioned between said collection lens and said photodetector.

3. The apparatus of claim 1 wherein, the light source comprises an incoherent light source.

4. The apparatus of claim 1 wherein, the light source comprises a coherent light source.

5. The apparatus of claim 3 wherein, said incoherent light source comprises an infrared light emitting diode.

6. The apparatus of claim 4 wherein, said coherent light source comprises a laser.

7. The apparatus of claim 6 wherein, said laser operates in an unfocused mode.

8. The apparatus of claim 1 wherein, each of said first through fourth cells are square shaped.

9. The apparatus of claim 1 wherein, each of said first through fourth cells have the shape of an isosceles triangle.

10. The apparatus of claim 1 wherein, each of said first through fourth cells have the shape of an equilateral triangle.

11. The apparatus of claim 1 wherein, each of said first through fourth cells are rectangular shaped.

12. The apparatus of claim 1 wherein, each of said first through fourth cells have the shape of a semicircle.

13. The apparatus of claim 1 wherein, each of said first through fourth cells are pie shaped.

14. The apparatus of claim 8 wherein, each of said square shaped cells are rotated by an angle of approximately 57 relative to the horizontal.

15. The apparatus of claim 1 wherein, said plurality of nonreflective areas comprise a plurality of grooves and said plurality of reflective areas comprise a plurality of land areas, each of said land areas existing between two adjacent grooves.

16. The apparatus of claim 1 wherein, said plurality of nonreflective areas comprise a plurality of darkened regions and said plurality of reflective areas comprise a plurality of land areas, each land area existing between two or more of said darkened regions.

17. The apparatus of claim 1 wherein, said medium is a disk with said plurality of nonreflective areas comprising a plurality of concentric, noncontinuous regions.

18. The apparatus of claim 1 wherein, said plurality of nonreflective areas comprise a single continuous spiral region.

19. The apparatus of claim 1 wherein, said medium comprises a magnetic recording media with said reflective areas including one or more data tracks incorporated therein.

20. The apparatus of claim 1 wherein, said first width is equal to said second width.

21. The apparatus of claim 1 wherein, said medium includes a plurality of holes extending substantially perpendicularly through said medium whereby the holes function as the reflective areas.

22. The apparatus of claim 1 wherein, said medium includes a plurality of relatively transparent spots whereby said spots function as the reflective areas.

23. The apparatus of claim 1 wherein, said medium comprises a floppy magnetic disk.

24. The apparatus of claim 1 wherein, said medium comprises a hard magnetic disk.

25. The apparatus of claim 1 wherein, said medium comprises a magnetic tape.

26. The apparatus of claim 1 wherein, said medium comprises a hard disk comprised of a metallic substance.

27. The apparatus of claim 1 wherein, said medium is positioned between said light source and said detector.

28. A method for generating servo information from a magnetic medium which comprises:
   a. illuminating a region of a magnetic medium having a plurality of concentric nonreflective tracks and a plurality of concentric reflective tracks with light;
   b. focusing an image of at least one nonreflective track and an image of at least one reflective track on a detector array comprised of at least four signal generating cells;
   c. generating an output signal from each of said cells as said image of at least one nonreflective track and said image of at least one reflective track passes said detector array; and
   d. using said signal as a source of servo information for a magnetic read/write transducer.

29. The method of claim 28 further including,
   a. pulsing said light prior to illuminating said magnetic medium; and
   b. applying synchronous detection techniques to said output signal from each of said cells.

30. The method of claim 28 further including, e. combining said output signals to form a position error signal;

f. determining an offset value for a magnetic read/write head which will allow the magnetic read/write head to be aligned over at least one of said plurality of concentric reflective tracks;

g. inputting said offset value into a signal generator capable of generating a waveform which incorporates said offset value; and h. mixing said waveform with said position error signal in order to cause said magnetic read/write head to be aligned over at least one of said plurality of concentric reflective tracks.

31. A method for electronically aligning a magnetic read/write head over a data track which comprises:

a. determining an offset value for a magnetic read/write head which will allow the magnetic read/write head to be aligned over a data track on a floppy disk;

b. generating a first signal which incorporates said offset value;

c. generating a second signal from a photodetector array comprised of at least four light sensitive cells which is a function of the position of a servo head with respect to one or more optical servo tracks positioned on a surface of said floppy disk; and d. causing said magnetic read/write head to become aligned over said data track in response to a mixing of said first signal with said second signal.

32. A method of causing a magnetic read/write head to sweep across a plurality of data tracks without leaving a position loop which comprises:

a. determining a distance a magnetic read/write head must move to change between a plurality of data tracks positioned on a surface of a floppy disk;

b. generating a first signal which incorporates said distance;

c. generating a second signal from a photodetector array comprised of at least four light sensitive cells which is a function of the position of a servo head with respect to one or more nuptial servo tracks positioned on said surface; and d. causing said magnetic read/write head to sweep across said data tracks in response to a mixing of said first signal with said second signal.

33. An apparatus for extracting servo control information from a magnetic information storage medium containing a plurality of reflective areas and a plurality of nonreflective areas which comprises:

a light source for illuminating a plurality of reflective areas having a first width, and a plurality of nonreflective areas having a second width, on a surface of a magnetic medium;

a collection lens for focusing an image of at least one of said reflective areas and at least one of said nonreflective areas;

a photodetector comprising a first cell, a second cell, a third cell and a fourth cell, said first through fourth cells functioning to generate a first output signal, respectively, in response to illumination of said first through fourth cells by said image, and each of said first through fourth cells having approximately identical shapes, said shapes causing said first through fourth output signals to vary continuously as said image moves relative to said first through fourth cells;

first electrical means for combining said first output signal and said second output signal to form a normal signal;

second electrical means for combining said third output signal and said fourth output signal to for a quadrature signal that is out of phase relative to said normal signal; and third electrical means for combining said normal and said quadrature signals to form a position error signal for providing servo control information to a magnetic read/write transducer.

* * * * *

UNITED STATES PATENT AND TRADEMARK OFFICE
CERTIFICATE OF CORRECTION

PATENT NO. : 4,958,245

DATED : September 18, 1990

INVENTOR(S) : Maxim Roth; Jimmy D. Godwin; Roger O. Williams

It is certified that error appears in the above-identified patent and that said Letters Patent is hereby corrected as shown below:

Column 16, line 2, the word "nuptial" should be "optical".

Signed and Sealed this

Eleventh Day of August, 1992

Attest:

DOUGLAS B. COMER

Attesting Officer

Acting Commissioner of Patents and Trademarks